United States Patent [19]
Ballman

[11] 3,819,995
[45] June 25, 1974

[54] TIME RESPONSIVE STARTING SWITCHES

[76] Inventor: Gray C. Ballman, 30 Portland Dr., Saint Louis, Mo. 63131

[22] Filed: Mar. 14, 1973

[21] Appl. No.: 341,234

[52] U.S. Cl. ............................ 318/221 E, 318/227
[51] Int. Cl. ............................................. H02p 1/44
[58] Field of Search ............ 318/221 E, 221 R, 227

[56] References Cited
UNITED STATES PATENTS

| | | | |
|---|---|---|---|
| 3,519,911 | 7/1970 | Frank | 318/227 X |
| 3,530,348 | 9/1970 | Conner | 318/227 X |
| 3,740,631 | 6/1973 | Fricker et al. | 318/221 E |
| 3,746,951 | 7/1973 | Hohman | 318/221 E |

Primary Examiner—Gene Z. Rubinson
Attorney, Agent, or Firm—Joseph A. Fenlon, Jr.

[57] ABSTRACT

I have invented a resettable starting switch for use in single phase electrical motors which switch provides a capacitor to develop a d-c charge upon the application of external power to the motor, and utilizes the charge of said capacitor to supply power to the start winding of said motor for a finite period of time, after which time a time responsive control circuit discharges the capacitor instantaneously, separating the start winding from the external power, and holds the start winding separated through a capacitively controlled SCR so long as external power continues to be supplied, and which thereafter resets itself when external power is cut off.

7 Claims, 1 Drawing Figure

PATENTED JUN 25 1974  3,819,995
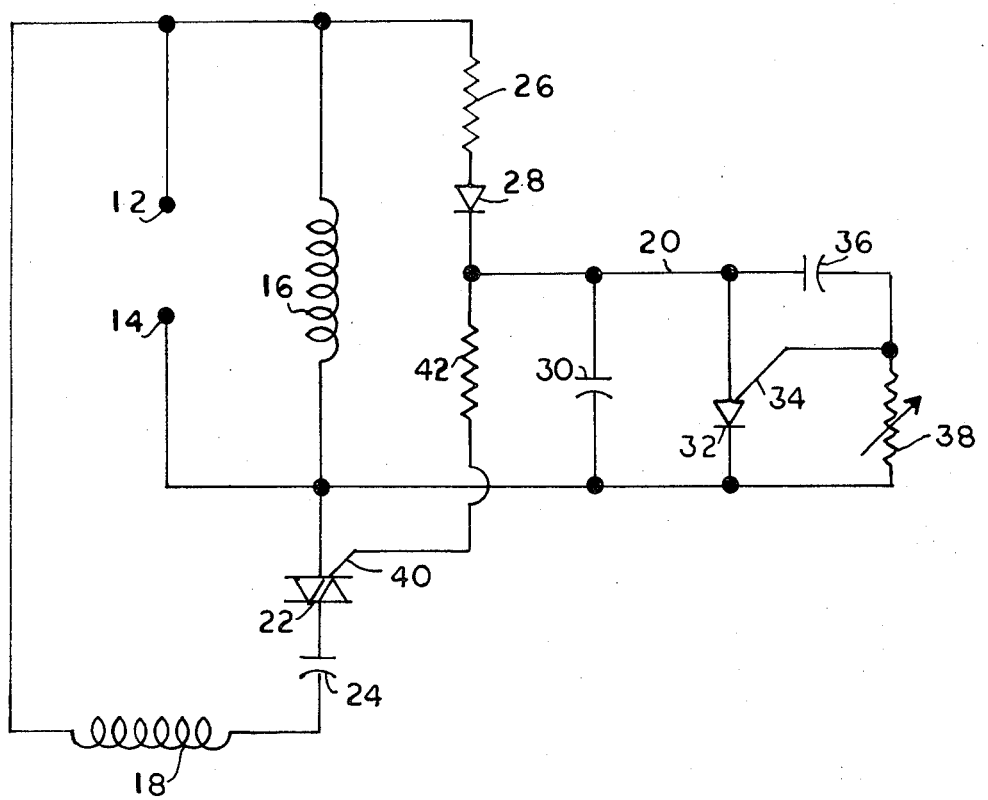

TIME RESPONSIVE STARTING SWITCHES

It is the object of this invention to provide a starting switch for use in supplying electrical power to a start winding in a rotating electrical device and which cuts off the supply of such power after the elapse of a selectable period of time.

With the above and other objects in view, which will become immediately apparent upon reading this specification, my invention resides in the unique and novel form, construction, arrangement and combination of the various elements shown in the drawings, described in the specification and claimed in the Claims.

IN THE DRAWING

The FIGURE represents an electrical schematic diagram of a preferred embodiment of my invention.

Referring now in more detail and by reference character to the drawing which illustrates a preferred embodiment of my invention the numerals 12 and 14 designate the power terminals of an electrical motor including a run winding 16 connected across the power terminals 12, 14, and a start winding 18.

The electrical switch 20 includes a Triac 22 and a capacitor 24 in series with the run winding 18 across the terminals 12, 14. The switch 20 also includes in series across the power terminals 12, 14, a first resistor 26, a diode 28 and a capacitor 30. Connected in parallel with the capacitor 30 is an SCR 32 having a gate lead 34 and also connected in parallel with the capacitor 30 is a second capacitor 36 and a variable resistor 38 in series with each other. The gate lead 34 is connected to the junction between the capacitor 36 and the variable resistor 38. The control lead 40 of the Triac 22 is connected to the junction between diode 28 and capacitor 30 through a second resistor 42.

OPERATION

When power is applied to the power terminals 12, 14, halfwave voltage passes through diode 28 and capacitor 30 begins slowly to charge. Once capacitor 30 begins charging, Triac 22 is turned on by the voltage transmitted to control lead 40 through resistor 42 and power is applied instantaneously to start winding 18. The Triac 22 remains on until SCR turns on at which time capacitor 30 will discharge through SCR 32.

Operaion of SCR 32 is controlled by the charge on the two capacitors 30 and 36. The charging of capacitor 30 has been previously explained. Capacitor 36 develops its charge through variable resistor 38 which is of sufficient magnitude to create a time delay between the time capacitor 30 starts charging and capacitor 36 becomes charged, and which is variable to permit regulation of the time delay. The time delay is preset to provide a predetermined period during which external power is applied to the start winding 18, thereby assuring that the start winding 18 will be assisting the run winding 16 for the particular load required for a finite period of time.

After the SCR 32 is turned on, it is held in conduction by capacitor 36 retaining a charge so long as external power continues to be applied to terminals 12, 14. When power is removed from terminals 12, 14 SCR 32 goes out of conduction and capacitor 36 discharges slowly through the anode to gate leakage resistance of SCR 32, after which discharge the switch 20 has reset itself.

The following values have been found to provide a suitable switch:

| Resistances (Ohms) | Capacitances (Microfarads) |
| --- | --- |
| R 26–8.2K | C 24–145 mf |
| R 38–0–820K | C 30–5 mf |
| R 42–1.8K | C 36–3 mf |

It should be readily apparent that a pair of the switches 20 may be used on the appropriate windings of a reversible motor to achieve a reversible motor with resettable control switches which operate purely on the basis of elapsed time and are independent of motor velocity or winding current. It is believed these switches are the pioneers of this type of switch.

Various changes and substitutions for the element shown herein may be made without departing from the nature and principle of my invention, which is set forth in the following Claims.

I claim:

1. An electrical switch for use with an electrical motor having a start winding and a run winding and adapted to operate upon application of external power to a pair of its terminals across which said run winding is connected, said switch comprising a triac having its major leads connected in series with said start winding across said terminals and also having a control lead, a voltage sensing circuit comprising a first resistor in series with a diode and a first capacitor and being connected across said terminals, said capacitor having one plate connected to one of said terminals and the other plate connected to the control lead, an SCR having its anode and cathode connected in parallel with said first capacitor and also having a gate lead, and an SCR control circuit also connected in parallel with said first capacitor and comprising a second capacitor in series with a variable resistor, said gate lead being connected to the common junction of said second capacitor and said variable resistor.

said gate lead being connected to the common junction of said second capcapacitor and said variable resistor.

2. The device of claim 1 in which said other plate of the first capacitor is connected to the control lead through a second resistor.

3. The device of claim 1 in which the second capacitor and the anode of the SCR are connected to the control lead plate of the first capacitor in the circuit described and the anode of the SCR and the variable resistor is connected to the terminal plate of the first capacitor.

4. An electrical switch for use with an electrical motor having a start winding and a run winding and adapted to operate upon application of external power to a pair of terminals across which said run winding is connected, said switch comprising a Triac in series with the start winding and including a control lead, a first capacitor connected between the control lead and one of the terminals, voltage sensing means for developing across the first capacitor a charge of sufficient magnitude to turn on the Triac when external power is applied to the terminals, timing means for removing the charge from the first capacitor and turning off the Triac after the elapse of a predetermined period of time measured from the instant when external power was applied to the terminals, and holding means for holding the Triac in the off condition after the charge has been removed from the first capacitor and while external power continues to be applied to the terminals, said timing means including a variable resistor in series with a second capcitor, both connected in parallel with the first capacitor.

5. The device of claim 4 in which the holding means includes an SCR, the anode and cathode of which are connected in parallel with the first capacitor, and the gate lead of which is connected intermediate the second capacitor and the variable resistor.

6. The device of claim 5 in which the second capacitor is located between the anode and the gate lead of the SCR.

7. The device of claim 6 in which a resistor is interposed between the first capacitor and the control lead.

* * * * *